H. A. CARPENTER & A. W. WARNER.
CONVEYING AND WEIGHING MECHANISM FOR CHARGING MACHINES.
APPLICATION FILED JULY 7, 1914.

1,183,797.

Patented May 16, 1916.
4 SHEETS—SHEET 1.

UNITED STATES PATENT OFFICE.

HENRY A. CARPENTER AND ARTHUR W. WARNER, OF SEWICKLEY, PENNSYLVANIA, ASSIGNORS TO RITER-CONLEY MANUFACTURING COMPANY, OF PITTSBURGH, PENNSYLVANIA, A CORPORATION OF NEW JERSEY.

CONVEYING AND WEIGHING MECHANISM FOR CHARGING-MACHINES.

1,183,797.  Specification of Letters Patent.  Patented May 16, 1916.

Application filed July 7, 1914. Serial No. 849,595.

*To all whom it may concern:*

Be it known that we, HENRY A. CARPENTER and ARTHUR W. WARNER, citizens of the United States, residing at Sewickley, in the county of Allegheny and State of Pennsylvania, have invented certain new and useful Improvements in Conveying and Weighing Mechanism for Charging-Machines, of which the following is a specification.

Our invention relates to improvements in charging and discharging machines employed in connection with carbonization plants for the manufacture of coal gas, and the present invention more particularly relates to means for supplying a definite predetermined amount or charge of coal to the respective retorts of the gas benches. Heretofore, attempts have been made to supply the charger of a machine of this character with a predetermined quantity of coal; for example, it has been customary to measure out charges of coal for the retorts by volume, but experience has shown that the coal does not run uniformly as to weight per cubic foot; also, that fine coal when damp is fluffy and light. The difference between dry fine coal and damp fine coal may amount to as much as ten per cent. Owing to this varying weight in the charges when measured by volume, it is almost impossible to maintain uniformity. This practice of measuring the charges of coal by volume also necessitated maintaining excessive heats; for example, if heat were maintained sufficient to carbonize the heavier charges, the lighter charges would be over-carbonized, and heat would be wasted. On the other hand, if heat were maintained to carbonize the lighter charges, the heavier charges would be under-carbonized and all the gas would not be driven from the coal. Weighing apparatus has also heretofore been employed, but as constructed and operated, has been unsatisfactory in supplying uniform charges to the charger of the machine, and consequently, the objectionable features due to the lack of uniformity of said charges as above pointed out, have been present.

An object of the present invention is to provide effective, automatically operable means for delivering uniform predetermined charges of coal to the retorts of the gas benches.

A further object of the present invention is to provide means for delivering individual charges of predetermined weight and mechanism operated thereby for indicating the number of charges, whereby the total weight of the coal charged during any desired period of time may be ascertained.

Under our method and by means of our apparatus, we make it possible not only to supply uniform predetermined charges to the respective retorts, but to maintain uniform heat within the retorts, and to carbonize all the charges of coal with a minimum amount of heat.

In the accompanying drawings, which illustrate an application of our invention.

Referring to the drawings, 2 designates a bin or hopper supported on the upper portion of the frame-work 3 of a charging and discharging machine designed to travel along a track disposed in front of benches of retorts, a portion of one bench being designated D. The bin 2 is preferably provided with two pockets 4 and 5, each respectively having an opening 6 designed to permit the passage of coal through the openings on to a slightly inclined trough 7 located adjacent to and slightly below the respective openings 6 of the two pockets. The coal deposited upon the troughs 7 is designed to be moved therefrom by a conveyer means on to a weighing mechanism, the latter being interposed between said troughs and a chute 8, through the latter of which the charge of fuel for a retort is introduced after it has been weighed.

The conveyer mechanism designed to convey the coal from the troughs 7 to a dumping bucket or receptacle 9 carried by or constituting a part of the weighing mechanism, comprises two belt conveyers 10 driven by means of an electric motor 11, hereinafter referred to as the feeder conveyer motor, and intermediate mechanism comprising, as illustrated, a gear 12, a pinion 13, a worm 14, and a wheel 15, the said motor and the gearing mentioned being supported from a bracket 16 secured to a frame-work girder 17. The said gearing is coupled up with a shaft 18, the latter being provided with universal joints 19 and 20, and a pinion 21. Pinion 21 articulates with a gear 22 mounted on a shaft 23 on which conveyer driving sprocket wheels 24 are attached. Gear 22 also meshes with a similar gear 25 mounted on a shaft 26 similar to shaft 23, and the latter shaft is provided with driving sprocket wheels 24$^a$ similar to the sprocket wheels 24 above referred to. The two gears 22 and 25 thus articulating, together with their shafts 23 and 26 and attached sprockets are symmetrically disposed each to each with respect to the center line of the machine, and constitute the driving means for the two feeder conveyers. Proper bearings for the pinion 21 and shafts 23 and 26 are provided in the dust proof casing 27 bolted to the rear partition plate 28 of the storage bin 2, while the necessary front bearings for the sprocket shafts 23 and 26 are supported by dust proof castings 29 and 30 bolted to the front wall 31 of the bin 2.

32 and 33 designate idle sprocket shafts preferably mounted as shown upon bearings supported in dust proof castings 34, the latter being respectively bolted to the front and rear walls or partition plates of the bin.

Each of the conveyers comprises buckets 35 attached to an endless steel roller chain 36 articulating with the idle sprockets 37 and driving sprockets 24 and 24$^a$.

Located below the respective troughs 7, we provide a trough 38 designed to catch any of the coal spilled from the upper trough 7.

It will be understood that the rotation of the feeder conveyer motor in the desired direction will cause the two conveyers, moving over the two troughs 7 toward the center of the machine, to carry coal from each pocket of the bin to the center of the machine and deliver it into the dumping bucket 9, and that the returning buckets passing over the lower trough will elevate any coal that may have been caught there to the upper trough 7.

The dumping bucket 9 constitutes a portion of the weighing mechanism, and is designed after receiving a predetermined quantity of coal and at the proper time, to be turned over with a slow inverting motion to discharge its contents into chute 8. As illustrated, the dumping receptacle comprises a horizontal cylindrical shell with closed ends and a longitudinal opening 39 at its top to catch the coal as it is pushed off of the troughs by the conveyer. Attached to both ends of the bucket, coincident with the axis of the cylindrical shell are shafts 40 and 41, respectively passing through the rear and front walls of the bin 2, the ends of said shafts being respectively mounted in bearings 42 supported in the middle of beams 43 and 44 of the weighing mechanism. The shafts 40 and 41 are driven by means of an electric motor 45, hereinafter referred to as the dump motor. This dump motor 45 is also mounted on beam 43, and is coupled with the shaft 40 through the medium of gear and pinion connection 46 and worm and wheel connection 47, whereby the dump bucket may be caused to rotate on its axis.

The ends of the beams 43 and 44 are provided with knife edges 48 which bear down upon link connections 49, which latter are in turn suspended from knife edges 50 formed on arms 51 secured fast to hollow torsion shafts 52 and 53. Each of the shafts 52 and 53 is provided underneath with two knife edges 54 and 55, one at either end, said knife edges 54 and 55 bear down upon bearing blocks 56, held in stirrups 57. Stirrups 57 are suspended from a beam 59 of the machine by adjustable rods 58.

At the rear end of the torsion shaft 52, we secure an arm 60 and at the corresponding end of torsion shaft 53 is a bifurcated arm 61. Arm 60 is provided with knife edge 62 and arm 61 is provided with knife edge 63. The knife edges 62 and 63 are in line with each other and bear down upon link connections 64, which latter are in turn suspended from a common knife edge 65 secured to one end of a scale beam 66. Scale beam 66 is fulcrumed upon a knife edge 67 carried on a link connection 68, the latter being suspended from beam 59 by means of a hanger hook 69. The opposite end of the scale beam 66 is provided with a sliding weight 70 adapted to move over a graduated scale 71. The outer or free end of the scale beam 66 is designed to come into contact with a stop 72 by which the movement of said arm is limited. Scale beam 66 is further provided intermediate its ends with a knife edge 73 designed to make contact with another link connection 74 suspended from a knife edge 75 carried on one arm 76 of a three-armed lever 77, said three-armed lever 77 being pivotally mounted upon a bearing block 78 carried on beam 59. In addition to the arm 76, the said three-armed lever 77 comprises a projecting weighted arm 79, the weight 80 thereof being greater than the weight 81 of an upwardly projecting pivotally mounted arm 82. The remaining arm of lever 77 is a hollow arm 83 into which projects arm 82. The function of the arm 83 is to rotate the weighted arm 82 about its axis for the purpose of bringing the same into and out of contact with a switch arm 84 projecting upwardly and outwardly from a switch device 85 carried upon the beam 59. Scale beam 66 is provided with a counterweight 86.

In the operation of the scale mechanism, as illustrated, the weight 70 is positioned upon the scale beam 66 for the purpose of predetermining the weight of a charge, and it will be evident that when this predetermined charge is supplied to the dumping bucket, the scale beam 66 will move upwardly causing weighted arm 79, through link connection 74, to move toward a vertical position, and in so doing, the arm 83 is also moved toward the vertical thereby causing the weighted arm 82 to also move toward a vertical position. When the arm 79 passes its center of gravity, arm 82 will fall into contact with switch arm 84, and thereby, by means of the switch 85, break the electrical circuit to feeder conveyer motor 11 and stop the conveyers. The conveyers co-operate in conjunction with the dumping bucket 9, and in this connection, the shaft 40 of the dumping bucket is provided with a switch 87 adapted to rotate with said shaft 40, which switch is adapted to act in the control of the motors 11 and 45. This switch is arranged in conjunction with electrical circuits hereinafter described for permitting the movement of the fuel conveyers only at the time the dumping bucket is empty and in position to receive the coal from the conveyers.

Figure 1:
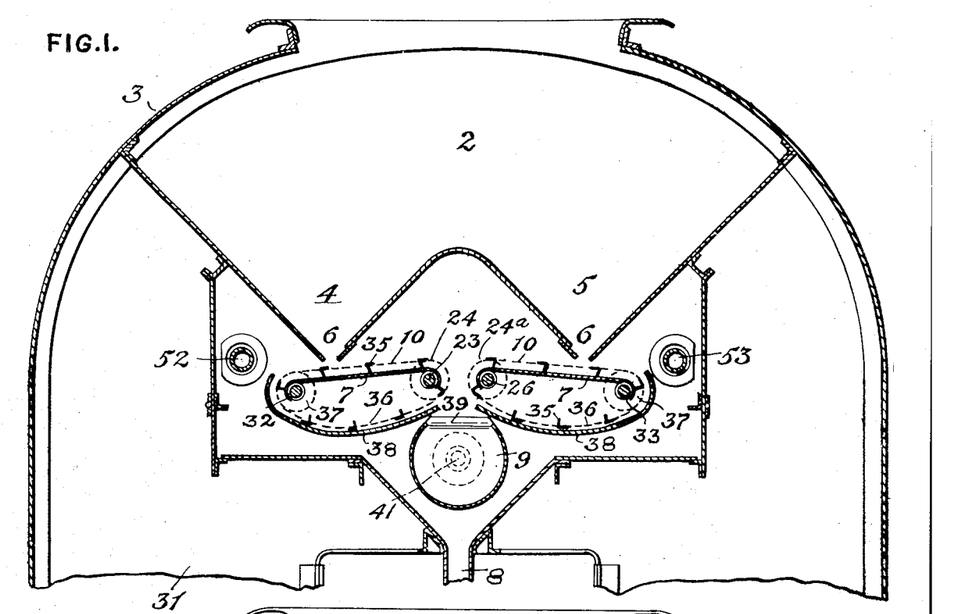
Figure 1 is a vertical section on the line 1—1 of Fig. 4.
Figure 2:
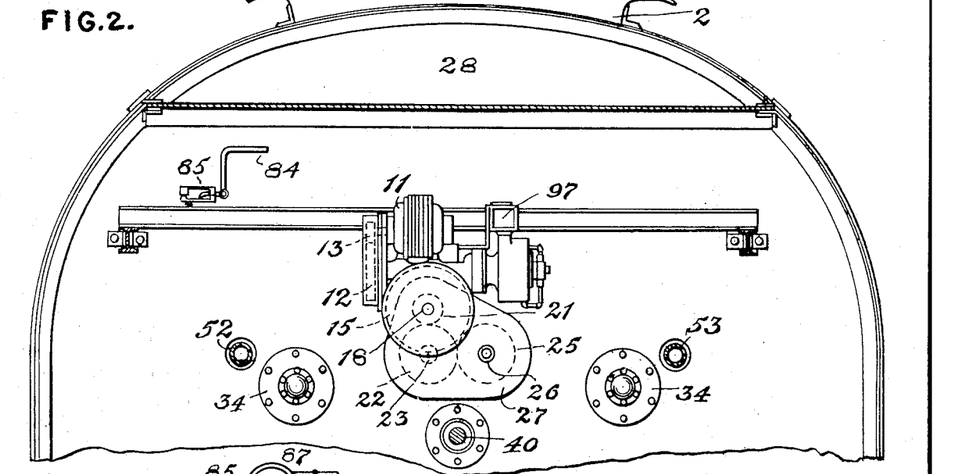
Fig. 2 is a rear elevational view illustrating the mechanism employed to operate the feeder conveyer.
Figure 5:
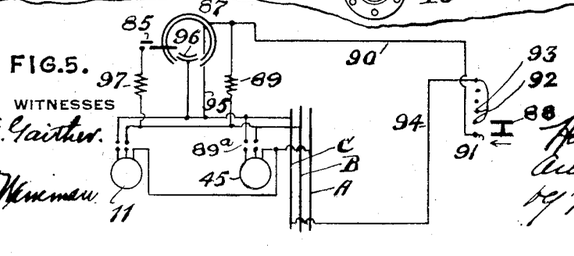
Fig. 5 is a diagrammatic view of wiring employed.

The operation of the charging machine to which this invention is applied is controlled and operated by a series of electrical motors, and for the purpose of running said motors, we employ a three-phase system of wiring. Under this system, power is delivered by three line wires, A, B and C between any pair of which exists an equal voltage which will drive current through a conductor connected between any pair; by locating the solenoid of a solenoid-operated switch within this circuit, such switch being adapted to control a motor circuit, the closing of a circuit through such conductor will energize the solenoid to close the motor switch. Each solenoid on this machine is thus connected between a pair of line wires when it is desired to operate the solenoid. In the wiring diagram, see Fig. 5, the three line wires are designated by A, B and C, and referring to this diagram and assuming that the dump bucket is in position as shown by Fig. 1 filled with a charge of coal and the conveyers 10 are at rest, it is then desired to dump the charge of coal into the chute 8 leading to the charging apparatus of the machine (see Fig. 6). The switch 88 is closed establishing a circuit through the dump solenoid 89 as follows: line B, solenoid 89, wire 90, points 91, 92 to wire 94, thence to line C. The energizing of solenoid 89 thereby closes switch 89ª which connects the two motor terminals to lines C and B, line A being connected direct. The start thus given to the dump motor 45 drives the automatic switch 87, the movements of which establish another circuit through solenoid 89 as follows: line C, through wire 95, switch 87, solenoid 89, to line B, it being understood that this latter circuit is normally broken and is closed by the movements of the dump motor 45. By this arrangement, the circuit for motor 45 is rearranged after said motor has started its operation, thereby by-passing switch 88, enabling the latter to be used as a switch for controlling the time when the motor operations are to begin, this switch 88 being of any preferred type for providing this timing action. As will be obvious, the timing action of this switch is at the will of the operator. The circuit thus made is automatically broken when the switch 87 coasts off the stationary conductor, at which time bucket 9 has been dumped and is again erect and the device is ready, through contact 96 and switch 85, to start the feeder conveyer motor 11 by means of its solenoid 97 when the switch 87 has moved sufficiently to cause contact 96 to close the circuit, this circuit being completed from line C to line B through contact 96, switch 85, and solenoid 97.

Figure 3:
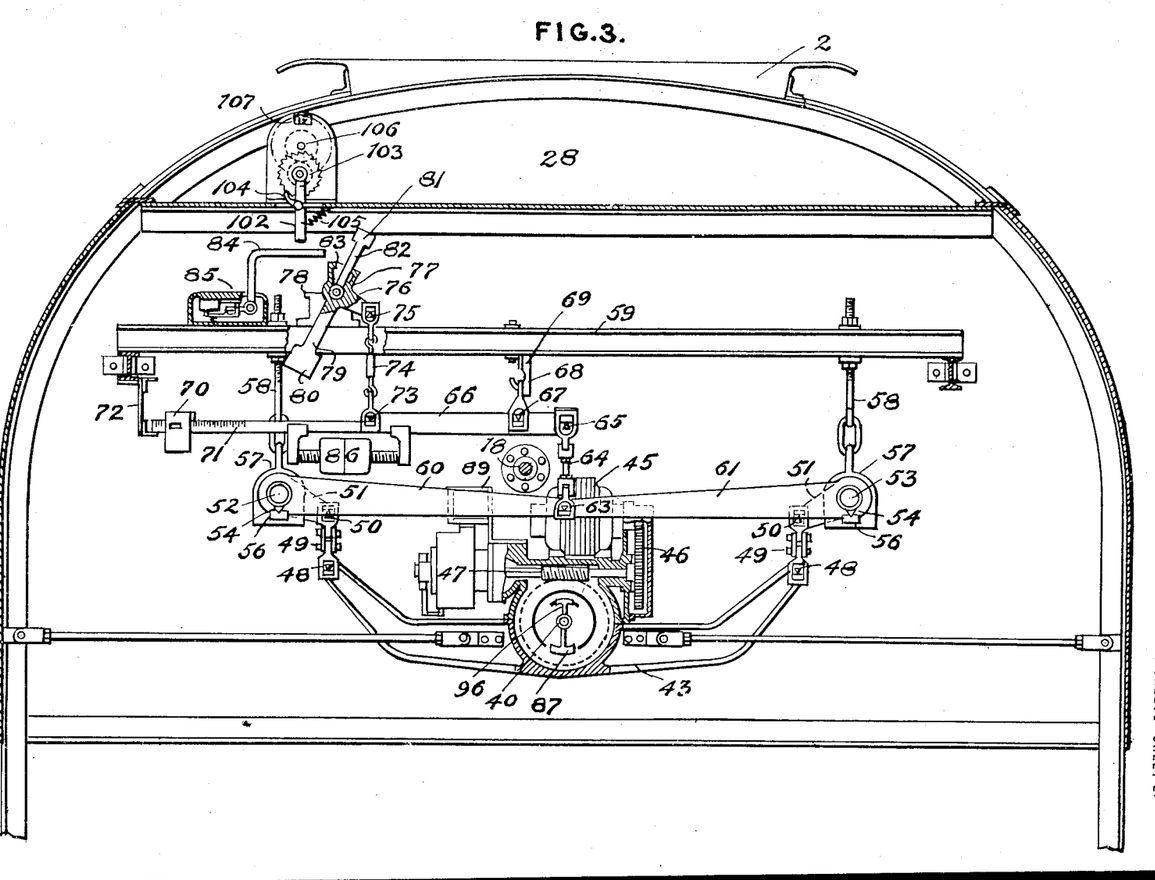
Fig. 3 is a similar view on an enlarged scale, illustrating the weighing mechanism with a portion of the dump receptacle operating mechanism in section.
Figure 4:
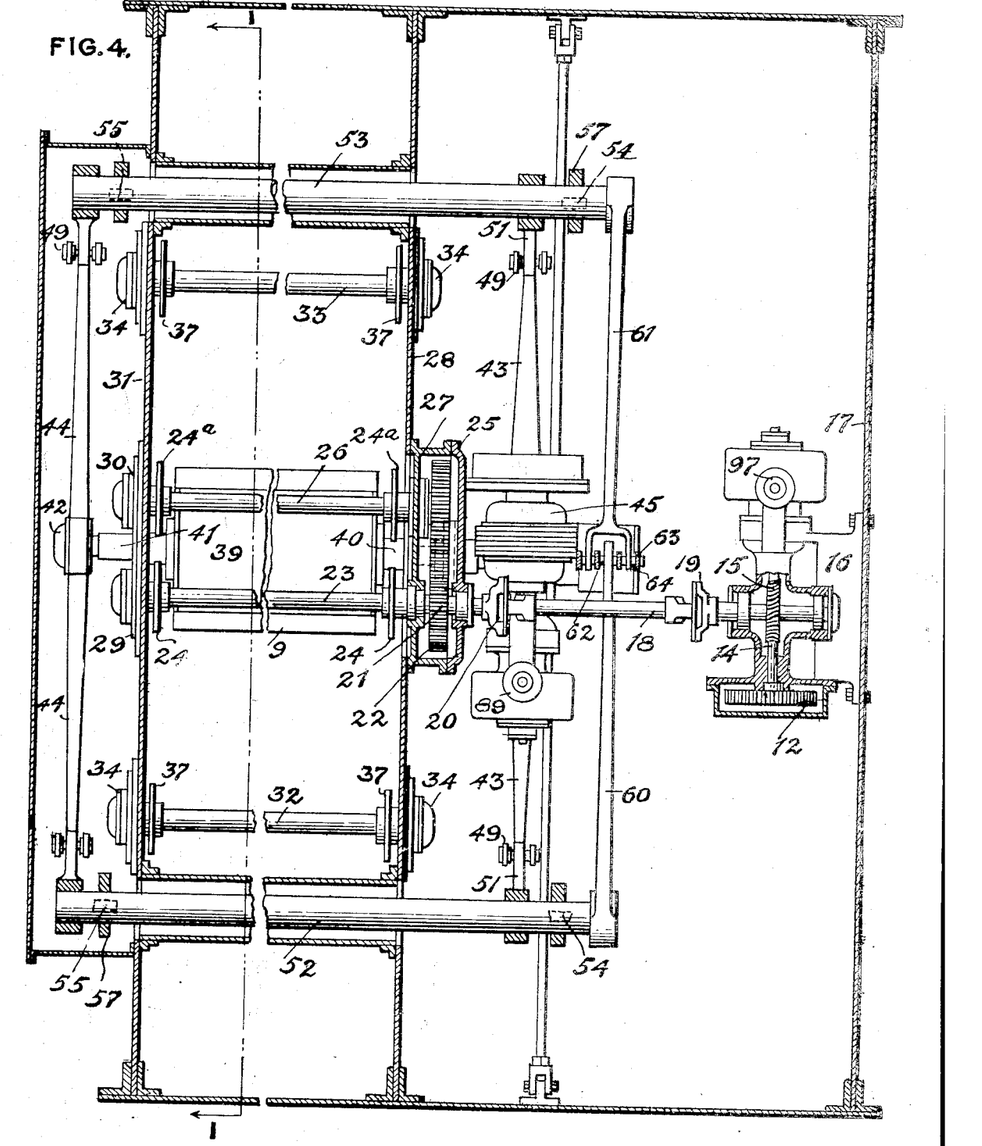
Fig. 4 is a plan view partly in section.

The operation of the feeder conveyer motor 11 is entirely dependent upon switch 85 and contact 96 (see diagram Fig. 5) and is as follows: Referring particularly to Figs. 1 and 3, the scale members are in the position assumed when the circuit is closed through trip switch 85 and contact 96. Under these conditions, it will be noted that the conveyers are delivering coal into the dump bucket 9 and will continue to thus deliver the coal until a predetermined amount is supplied thereto. Upon the delivering of this amount into the dump bucket, the weighing mechanism or a portion thereof will be depressed, thereby moving the scale beam 66 on its fulcrum point 67 and throwing arm 82 into contact with arm 84, as above described, thereby breaking the circuit through switch 85 and stopping the rotation of the feed conveyer motor. When it is desired to again discharge the coal from the dump bucket 9 into the chute, the circuit controlling feeder dump motor must be established between switch 88 and said motor. This is effected as above described.

Figure 6:
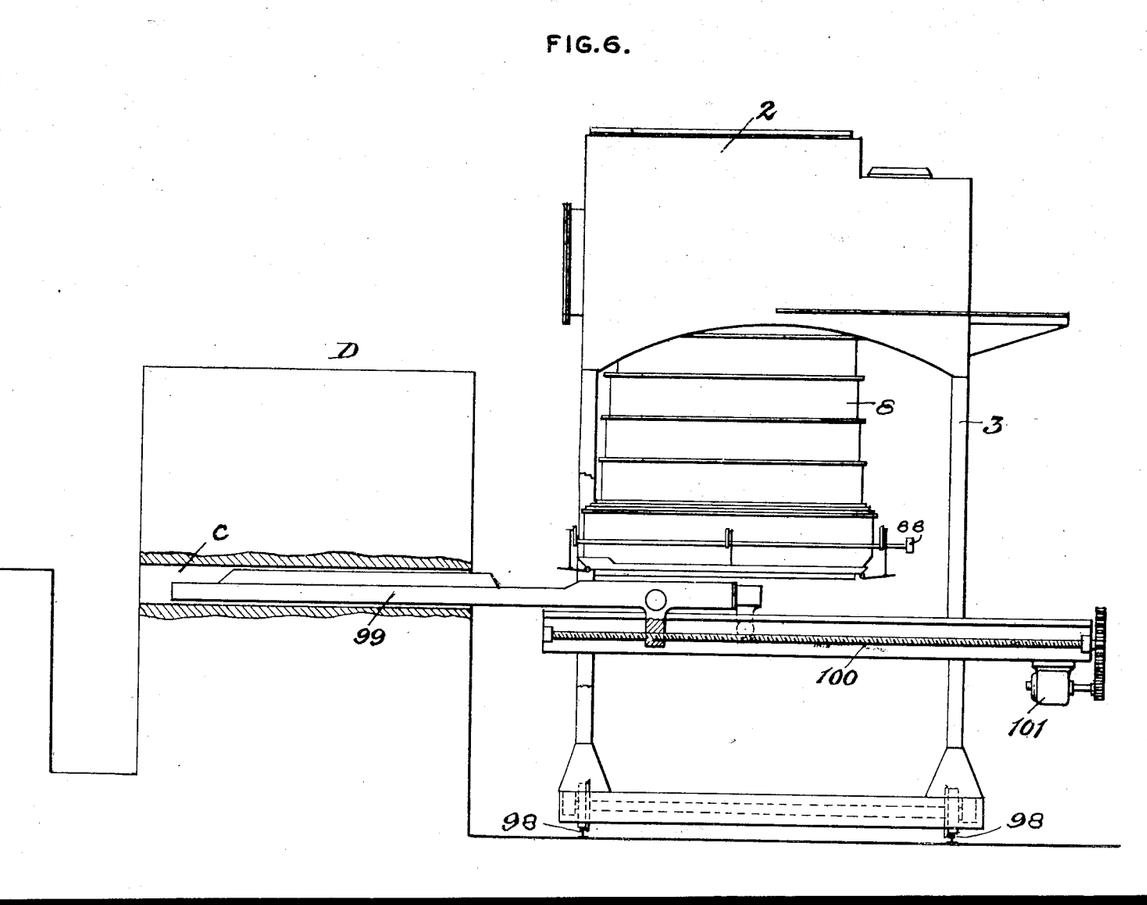
Fig. 6 is a diagrammatic view showing the charging and discharging machine, a portion of a stack of benches with the fuel charger in a retort of a bench.

In Fig. 6, we have shown diagrammatically a portion of a bench D of a stack of gas retort benches and a through retort c therein, in connection with our charging and discharging machine. Particularly referring to Fig. 6, the charging machine is adapted to travel along the front face of a stack of benches on a track 98. After the passage of the weighed fuel charge through the telescopic chute 8, the charge is received into a charger and discharger member 99. As illustrated, this member is projected forwardly into the retort c of a bench. The forward and backward movement of the charger and discharger is effected by means of a screw threaded shaft 100 operated by an electric motor 101, and intermediate mechanism coöperating with said screw shaft 100.

As will be readily understood, after the charger has deposited the charge within the retort, it returns to its position below the chute 8, where it receives the next charge. When the charger is in this position, the motor for the dumping bucket may begin its operation to dump the charge previously placed therein into the charger through the chute, this operation being provided by rotating the dumping bucket, the time of operation of which is controlled by the closing of the circuit by switch 88. As heretofore pointed out, the completion of this rotational movement of the dumping bucket automatically closes the energizing circuit for solenoid 97 and starts the feed conveyer motor to provide a new charge of predetermined weight within the dumping bucket, the conveying means continuing its operation until the weighing mechanism automatically breaks the circuit to motor 11, whereupon, the operation of the parts disclosed herein is discontinued until the charger has been again operated to deposit its charge at the next charging operation, the result being that the dumping bucket normally contains the coal which forms the succeeding charge for the charger, this condition being changed only when the charger is ready to receive such charge, whereupon, the dumping action takes place and the cycle of operations continues to immediately place the succeeding charge in position within the bucket. As a result, the charging machine, between successive charging operations carries (a) a charge on the charger, which charge is to be used in the next charging operation; (b) another charge of the proper weight and segregated from the supply ready to be delivered to the charger, this charge being carried by the dumping bucket, and (c) material in position to provide the third charge, this being the material carried by the troughs 7 when the conveying means cease operations. By this general arrangement, it will be readily understood that the time required to recharge the charger is reduced to a minimum through the provision of the charge present in the dumping bucket. Consequently, the time between successive chargings may be relatively short; for instance, the time required to travel from one retort to another, during which time the dumping operation may take place, it being readily understood that the operation of the conveyer to supply the succeeding charge to the dumping bucket may take place during the succeeding charging operation, the material so conveyed not reaching the chute until the next dumping operation. In other words, there is, practically at all times, a charge of definite, predetermined weight in reserve and which requires simply the dumping of the bucket to place it in position for charging.

In connection with the means for delivering individual charges of predetermined weight to the charger, we provide means for indicating each charge so delivered, whereby the total weight of the coal introduced into the retorts during any desired period of time may be determined. As illustrated, the mechanism for indicating the number of charges is operated by the weighing mechanism, the specific embodiment thereof is actuated by an arm 82 coming into contact with a pivotally mounted arm 102 of the charge indicating mechanism. This latter mechanism, in addition to arm 102, includes a notched disk 103 adapted to be moved one notch by a dog 104 carried on arm 102 at each forward movement of said arm. The return movement of arm 102 is effected by means of a spring 105. Disk 103 is designed to actuate through the medium of suitable gearing a shaft 106 of an indicating wheel 107.

The charging and discharging apparatus herein shown relates to that class of apparatus described and claimed in pending applications for patents Serial Number 530,383, filed November 29, 1909, Serial Number 784,644, filed February 15, 1913, and Serial Number 805,541, filed December 9, 1913, and as the present invention relates to the means hereinbefore particularly described, and not to the other parts of the machine, we deem it unnecessary to further describe in this application the charging and discharging machine to which our invention is applied.

What we claim is:—

1. In a traveling charging machine for supplying charges to gas retorts, said machine carrying a charger for introducing a charge into a retort, said charger being adapted to carry a charge of predetermined weight, a receptacle adapted to carry a reserve charge of similar weight, said receptacle being positionable to discharge its charge into the charger, and means operable at will for successively dumping the receptacle and supplying a new reserve charge in an automatic sequence.

2. In a traveling charging machine for supplying charges to gas retorts, said machine carrying a charger for introducing a charge into a retort, said charger being adapted to carry a charge of predetermined weight, a receptacle adapted to carry a reserve charge of similar weight, said receptacle being positionable to discharge its charge into the charger, and means operable at will for successively dumping the receptacle and supplying a new reserve charge, said successive operations forming a cycle automatically discontinued upon the completion of the new charge.

3. In a charging machine, a charger adapted to carry a charge of predetermined weight, a receptacle adapted to carry a reserve charge of similar weight, said receptacle being positionable to discharge its charge into the charger, and means operable at will for successively dumping the receptacle and supplying a new reserve charge, said means including mechanism for automatically stopping the charge-forming operations when said new charge has been completed.

4. In a charging machine, a charger adapted to carry individual charges, a permanently-positioned dumping receptacle adapted to supply the individual charges to the charger, means for delivering material to said receptacle, and control mechanism for correlating the operations of the receptacle and means to provide a reserve charge of predetermined weight of material within the dumping receptacle.

5. In a charging machine, a charger adapted to carry individual charges, a dumping receptacle adapted to supply the individual charges to the charger, means for delivering material to said receptacle, and control mechanism for correlating the operations of the receptacle and means to provide a reserve charge of predetermined weight of material within the dumping receptacle, said mechanism including means for dumping the reserve charge into the charger.

6. In a traveling charging machine for supplying charges to gas retorts, said machine carrying a charger for introducing a charge into a retort, a dumping receptacle adapted to supply the individual charges to the charger, means for delivering material to said receptacle, and control mechanism for correlating the operations of the receptacle and means to provide a reserve charge of predetermined weight of material within the dumping receptacle, said mechanism including means operable at will for dumping the reserve charge into the charger.

7. In a traveling charging machine for supplying charges to gas retorts, said machine carrying a charger for introducing a charge into a retort, and means for delivering a predetermined weight of material to the charger, said means comprising a delivery mechanism operable at will and a mechanism automatically operable upon completion of the delivery operation for supplying the predetermined weight of material to the delivery mechanism.

8. In a charging machine, a charger, and means for delivering a predetermined weight of material to the charger, said means comprising weighing mechanism, power-operated dumping mechanism, mechanism for feeding material to the dumping mechanism, and mechanism controlled by the weighing mechanism for stopping the feeding mechanism.

9. In a charging machine, a charger, and means for delivering a predetermined weight of material to the charger at will, said means comprising weighing mechanism, power operated dumping mechanism, mechanism for feeding material to the dumping mechanism, and mechanism controlled by the weighing mechanism for stopping the feeding mechanism.

10. In a charging machine, a charger, and means for delivering a predetermined weight of material to the charger, said means comprising weighing mechanism, dumping mechanism free from weighing mechanism control, and feeding mechanism, the cessation of feeding action being controlled by the weighing mechanism.

11. In a charging machine, a charger, and means for delivering a predetermined weight of material to the charger at will, said means comprising weighing mechanism, dumping mechanism free from weighing mechanism control, and feeding mechanism, the cessation of feeding action being controlled by the weighing mechanism.

12. In a charging machine, a charger, and means for delivering a predetermined weight of material to the charger at will, said means comprising weighing mechanism, dumping mechanism free from weighing mechanism control, and feeding mechanism having its starting operation controlled by the dumping mechanism and the cessation of such operation controlled by the weighing mechanism.

13. In a charging machine, a charger, and means for delivering a predetermined weight of material to the charger at will, said means comprising weighing mechanism, dumping mechanism free from weighing mechanism control, feeding mechanism, and independent mechanism for controlling the starting and stopping operations of the feeding mechanism.

14. In a charging machine, a charger, and means for delivering a predetermined weight of material to the charger at will, said means comprising weighing mechanism, dumping mechanism free from weighing mechanism control, feeding mechanism, control mechanism rendered active by the dumping mechanism for starting the feeding operation, and independent control mechanism rendered active by the weighing mechanism for causing cessation of the feeding operation.

15. In a charging machine, a charger, and means for delivering a predetermined weight of material to the charger, said means comprising a supply bin having a plurality of discharge openings, an individual conveyer for each opening, said conveyers being operable to discharge at a common point, a dumping bucket at such point of discharge, and weighing mechanism controlling the stoppage of conveyer operations.

16. In a charging machine, a charger, and means for delivering a predetermined weight of material to the charger, said means comprising a supply bin having a plurality of discharge openings, an individual conveyer for each opening, said conveyers being operable to discharge at a common point, a dumping bucket at such point of discharge, and weighing mechanism controlling the stoppage of conveyer operations, said dumping mechanism being supported by the weighing mechanism.

17. In a charging machine, a charger, and means for delivering a predetermined weight of material to the charger, said means comprising feeding mechanism, dumping mechanism, each of said mechanisms having individual power mechanisms in permanent engagement therewith, weighing mechanism, and control mechanism for independently controlling the operations of said power mechanisms.

18. In a charging machine, a charger, and electrically-controlled means for automatically delivering a predetermined weight of material to the charger at will.

19. In a charging machine, a charger, and means for delivering a predetermined weight of material to the charger, said means comprising motor-operated dumping mechanism, motor-operated feeding mechanism, weighing mechanism, circuits for said motors, and circuit make and break mechanism within said circuits to control the individual operations of the motors.

20. In a charging machine, a charger, and means for delivering a predetermined weight of material to the charger, said means comprising motor-operated dumping mechanism, motor-operated feeding mechanism, weighing mechanism, circuits for said motors, and circuit make and break mechanism within said circuits to control the individual operations of the motors to provide an initial dumping operation and a succeeding feeding operation.

21. In a charging machine, a charger, and means for delivering a predetermined weight of material to the charger, said means comprising motor-operated dumping mechanism, motor-operated feeding mechanism, weighing mechanism, circuits for said motors, and circuit make and break mechanism within said circuits to control the individual operations of the motors, said make and break mechanism including a make and break device controlled by the weighing mechanism for stopping the operation of the feeder motor.

22. In a charging machine, a charger, and means for delivering a predetermined weight of material to the charger, said means comprising motor-operated dumping mechanism, motor-operated feeding mechanism, weighing mechanism, circuits for said motors, and circuit make and break mechanism within said circuits to control the individual operations of the motors, said latter mechanism including a make and break device movable with the dumping mechanism and forming a time control in the operation of the feeder motor.

23. In a charging machine, a charger, and means for delivering a predetermined weight of material to the charger, said means comprising motor-operated dumping mechanism, motor-operated feeding mechanism, weighing mechanism, circuits for said motors, and circuit make and break mechanism within said circuits to control the individual operations of the motors, said make and break mechanism including a make and break device for starting the dumping motor operation, and means operated by the movements of the dumping motor for automatically rearranging the dumping motor circuit to by-pass said device.

24. In a charging machine, a charger, and means for delivering a predetermined weight of material to the charger, said means comprising motor-operated dumping mechanism, motor-operated feeding mechanism, weighing mechanism, circuits for said motors, and circuit make and break mechanism within said circuits to control the individual operations of the motors, said make and break mechanism including a make and break device for starting the dumping motor operation, and means operated by the movements of the dumping motor for automatically rearranging the dumping motor circuit to by-pass said device, said latter means carrying a make and break device operative in the feeder motor circuit to control the time of starting of the feeder motor.

25. In a charging machine, a charger, and means for delivering a predetermined weight of material to the charger, said means comprising motor-operated dumping mechanism, motor-operated feeding mechanism, weighing mechanism, circuits for said motors, and circuit make and break mechanism within said circuits to control the individual operations of the motors, said make and break mechanism including a make and break device for starting the dumping motor operation, and means operated by the movements of the dumping motor for automatically rearranging the dumping motor circuit to by-pass said device, said latter means carrying a make and break device operative in the feeder motor circuit to control the time of starting of the feeder motor, said feeder motor circuit including a make and break device under the control of the weighing mechanism for breaking the feeder motor circuit when a predetermined weight of material has been fed.

26. In a charging machine, a charger, and means for delivering a predetermined weight of material to the charger, said means comprising motor-operated dumping mechanism, motor-operated feeding mechanism, weighing mechanism, circuits for said motors, and circuit make and break mechanism within said circuits to control the individual operations of the motors, said make and break mechanism including a make and break device controlled by the weighing mechanism for stopping the operation of the feeder motor, and registering mechanism rendered active by the movements of the weighing mechanism to stop the feeder motor operation.

In testimony whereof we affix our signatures in presence of two witnesses.

HENRY A. CARPENTER.
ARTHUR W. WARNER.

Witnesses:
W. G. DOOLITTLE,
F. E. GAITHER.